May 9, 1939.　　　R. TRÖGER　　　2,157,929
SURGE GENERATOR
Filed Nov. 9, 1937
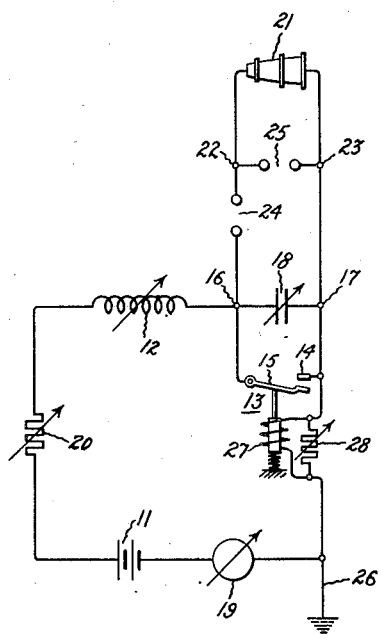
Inventor:
Richard Tröger,
by Harry E. Dunham
His Attorney.

Patented May 9, 1939

2,157,929

UNITED STATES PATENT OFFICE 2,157,929

SURGE GENERATOR

Richard Tröger, Berlin-Zehlendorf-Mitte, Germany, assignor to General Electric Company, a corporation of New York Application November 9, 1937, Serial No. 173,723
In Germany November 25, 1936

7 Claims. (Cl. 171—97)

My invention relates to surge generators and concerns particularly surge generators for use in testing insulators, bushings and cables and other electrical apparatus which must be capable of withstanding high voltage surges.

High surge voltage testing systems are known which employ the Marx circuit to charge condensers in parallel through high resistances and to discharge them in series through spark gaps whereby voltage multiplication is obtained according to the number of steps used. In order to reach relatively high surge voltages it is necessary to charge the condenser battery at high voltages with the order of magnitude of 100 kilovolts and for this purpose discharge tubes with series transformers are required.

It is an object of my invention to produce a simple, sturdy, surge generator in which such expensive equipment is not required and which consists only of comparatively inexpensive robust elements.

It is a further object of my invention to produce a reliable surge generator of comparatively light weight and adapted to construction in portable form.

It is still another object of my invention to produce a surge generator in which the peak voltage produced may readily be adjusted or limited manually or automatically and in which by adjusting the circuit constants any desired voltage may be obtained.

Other and further objects and advantages will become apparent as the description proceeds.

In carrying out my invention in its preferred form I utilize a relatively low voltage current source such as a storage battery, for example, capable of delivering a relatively large current and I store the amount of energy desired for testing in the form of electromagnetic energy in an inductance. The electromagnetic energy is then transferred into electrostatic energy to produce the desired surge voltage across the terminals of a condenser.

The invention will be understood more readily from the following detailed description when considered in connection with the accompanying drawing and those features of the invention which are believed to be novel and patentable will be pointed out in the claims appended hereto. The single figure of the drawing is a circuit diagram representing one embodiment of my invention.

The surge generator illustrated in the drawing consists of a source of current which is the storage battery 11 connected in series with a choke coil or inductance 12 and a switch 13 having relatively movable contacts 14 and 15 to which terminals 16 and 17 of a condenser 18 are connected. An ammeter 19 may also be connected in series with the circuit for the purpose of indicating the current flow and, if desired, a rheostat 20 may also be connected in series with the circuit for the purpose of controlling the magnitude of the current flowing. For the purpose of varying the magnitude of the peak voltage which may be obtained from the surge generator, the inductance of the choke coil 12 and the capacity of the condenser 18 may be made variable, or interchangeable units of different electrical constants may be provided.

The surge voltage for testing an object such as an insulator or bushing 21 appears at the terminals 16 and 17 of the condenser 18, but if desired a separate pair of output terminals 22 and 23 may be provided which are connected to the condenser terminals 16 and 17 in series with an ignition gap 24 for preventing application of the surge voltage to the object 21 to be tested until a predetermined potential difference has been reached. For measurement of the voltage applied an adjustable calibrated gap 25 may also be provided which is connected between the output terminals 22 and 23.

In order to safeguard the operators of the equipment and in order to make it unnecessary to insulate more than one terminal of any part of the apparatus for high voltage, one side of the current source 11 is grounded to a suitable ground connection 26 and the terminals 14, of the switch 13, and 17, of the condenser 18, are also joined to the ground connection 26.

When it is desired to supply surge voltage to the object 21 to be tested, a switch 13 is closed in order to produce a flow of current through the choke coil 12 and after the current has reached a steady value or has reached a sufficient value for the test to be made, as the case may be, the switch 13 is opened, interrupting the flow of current through the choke coil 12 and compelling the transformance of the electromagnetic field energy in the choke coil into electrostatic energy in the condenser 18. In this manner a relatively high voltage is produced between terminals 16 and 17 of the condenser 18 which breaks down the ignition gap 24 and applies surge voltage to the object 21 to be tested. The electromagnetic energy stored in the choke coil 12 is expressed by the equation: $E=\frac{1}{2}LI^2$, where E is the energy stored, L is the inductance of the choke coil 12, and I is the current flowing in the circuit. The electrostatic energy stored in the condenser 18 is expressed by the equation: $E = \frac{1}{2}CV^2$, where C represents the capacity of the condenser, and V the potential difference built up between its plates. Disregarding losses, the energy disappearing from the choke coil must equal the energy appearing in the condenser and the following equation is valid: $\frac{1}{2}LI^2 = \frac{1}{2}CV^2$.

The opening of the switch 13 is effected practically without voltage since the condenser 18, for a given current, has an impedance, $t/C$, where $t$ equals the time. At the first instant $t$ equals zero and the condenser has an impedance equal to zero, making the voltage across the switch 13 theoretically zero and negligible even in actual practice.

From the previously mentioned equation of energy balance the peak amplitude of the voltage produced by the surge generator may be obtained.

$$V = I\sqrt{\frac{L}{C}} = \frac{e}{R}\sqrt{\frac{L}{C}}$$

where $e$ is the voltage of the current source 11 and R is the resistance of the circuit. It is seen, therefore, that by suitable dimensioning of the inductance L, the capacity C and the direct current I any desired peak voltage can be reached. Consequently, a relatively small, low voltage storage battery which has, however, a large momentary current capacity is capable of producing a relatively high surge voltage.

Inasmuch as the storage battery 11 has relatively low voltage and one side of it is earthed, the left-hand side of the choke coil 12 is practically at ground potential and only the terminal 16 of the choke coil 12 need be insulated for high voltage; likewise only the terminal 16 of the condenser 18 and the terminal 15 of the switch 13 need be insulated for high voltage.

The apparatus disclosed provides a very convenient manner of obtaining different surge voltages for making different tests. For example, if the full available surge voltage is not needed, the switch 13 may be opened when the current in the choke coil 12 has risen to a predetermined value, and in this manner the energy stored in the choke coil 12 as well as that transformed into electrostatic energy in the condenser 18 is limited to the value necessary to produce the desired voltage. It will be understood that, owing to the time constant of the choke coil 12, the current therein will rise gradually, permitting the selection of the proper time for opening the switch 13. If desired, this may be done automatically instead of manually by providing the movable contact 15 of the switch 13 with an operating coil 27 having means for adjusting the point of operation such as an adjustable tension restraining spring or an adjustable resistance shunt 28. The operating coil 27 is thus adjusted to open the switch 13 at the current value required to produce the desired surge voltage value.

If desired, the magnitude of the surge voltage may also be adjusted by adjusting the steady value of the current which may finally be caused to flow through the choke coil 12 by current source 11. For example, the rheostat 20 may be used for this purpose.

Obviously altering the values of L and C will also vary the peak voltage which may be produced.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A surge voltage generator comprising an inductance, means for passing current therethrough, a condenser having terminals for connection to apparatus to which a surge voltage is to be applied, and a switch connected across said condenser in series with said inductance and means for passing current through the inductance, and being adapted to be opened to induce a surge voltage between the terminals of the condenser.

2. A surge voltage generator comprising an inductance, means for storing electromagnetic energy in the inductance, a condenser connected to the inductance, a pair of surge voltage output terminals and an ignition spark gap connected in series across said condenser, said spark gap being set to break down at a voltage at which it is desired to have the surge pass from said condenser to said terminals, and means for transferring electromagnetic energy from said inductance to said condenser in the form of electrostatic energy.

3. A surge voltage generator comprising an inductance, means for passing current therethrough, a switch connected in series with the inductance and means for passing current through the inductance, a condenser connected across the switch and having terminals serving as surge voltage output terminals, and means for opening said switch in response to a flow of current of a predetermined strength.

4. An adjustable surge voltage generator comprising a circuit element in the form of an inductance, means for passing current therethrough, a switch connected in series with said circuit element and means for passing current through it, a second circuit element in the form of a condenser connected across the switch and having terminals serving as surge voltage output terminals, such switch being adapted to be opened to induce a surge voltage between the terminals of the condenser, one of said circuit elements being adjustable in its electrical dimensions for the purpose of varying the magnitude of surge voltage generated.

5. An adjustable surge voltage generator comprising a circuit element in the form of an inductance, a circuit element in the form of a resistor, means for passing current through the said elements in series, a switch also connected in series therewith, a circuit element in the form of a condenser connected across the switch and having terminals serving as surge voltage output terminals, said switch being adapted to be opened to induce a surge voltage between the terminals of the condenser, one of said circuit elements being adjustable in its electrical dimensions for the purpose of adjusting the magnitude of the surge voltage generated.

6. A surge voltage generator comprising a source of current grounded on one side, an inductance connected thereto on the grounded side, a switch grounded on one side and connected on the ungrounded side to the ungrounded side of the inductance, and a condenser connected across the switch having terminals serving as surge voltage output terminals, such switch being adapted to be opened to induce a surge voltage between the terminals of the condenser whereby only one pole of any circuit element is subjected to high voltage.

7. In a surge voltage generator inducing surge voltages by transformance of electromagnetic energy in an inductance due to current flow therein into electrostatic energy in a condenser, the method of limiting the peak voltage generated which consists in determining the value of current through the inductance representing the amount of energy in the form of magnetic energy which equals the amount of energy in the form of electrostatic energy represented by a condenser voltage equaling said peak voltage and opening the circuit of the inductance when the current therein has attained the value determined.

RICHARD TRÖGER.